United States Patent [19]

Caruso

[11] 4,160,319
[45] Jul. 10, 1979

[54] CIRCULAR TO CHAIN SAW CONVERSION APPARATUS

[76] Inventor: Patsy Caruso, 547 S. Liberty St., Blairsville, Pa. 15717

[21] Appl. No.: 900,006

[22] Filed: Apr. 25, 1978

[51] Int. Cl.² ............................................. B27B 7/14
[52] U.S. Cl. ................................................. 30/122
[58] Field of Search ........................... 30/122, 383, 386

[56] References Cited

U.S. PATENT DOCUMENTS 4,121,336  10/1978  Loyd .................................. 30/122

Primary Examiner—Gary L. Smith
Assistant Examiner—W. D. Bray
Attorney, Agent, or Firm—Buell, Blenko & Ziesenheim

[57] ABSTRACT

A chain saw conversion unit for a portable power-driven circular saw is provided wherein the saw blade is replaced by a sprocket and the base plate of the saw is engaged between two adjustable attachment plate members having channel ends engaging the ends of the base plate of the saw, one of the attaching plates having a side flange below the sprocket carrying an adjustable blade bracket on which a cutter bar is attached at an angle to the plate and a saw chain is mounted around the cutter bar and sprocket. A friction clutch sprocket is provided to permit slippage in event of overload.

8 Claims, 5 Drawing Figures

CIRCULAR TO CHAIN SAW CONVERSION APPARATUS

This invention relates to circular to chain saw conversion apparatus, and particularly to a conversion apparatus which does not require drastic alteration of the circular saw to accomplish the conversion.

The idea of converting a circular saw to a chain saw has been the subject of considerable effort in the last several decades. Among the more significant of such apparatus are those shown in Trimmer U.S. Pat. No. 4,033,035, Siria U.S. Pat. No. 2,839,097, Wilder U.S. Pat. No. 2,860,671, Scott U.S. Pat. No. 2,879,814. Other, less pertinent patents, are U.S. Pat. Nos. 1,967,163; 2,489,772; 2,526,131; 2,544,810; 2,649,871; 3,009,493; 3,052,270; 3,056,439; 3,384,135; 3,583,106; 3,747,650 and 3,896,861. All of the foregoing patents are such that when converted, they require considerable time and effort to reconvert, or they have limited utility and/or limited cutting ability.

The present invention provides a chain saw attachment which can be quickly removed and replaced from any conventional circular saw without significant change in the saw structure while providing a configuration that is not objectionably bulky or unwielding. In addition, it provides a clutch drive arrangement for protection of both the operator and the saw.

I provide a chain saw conversion for a portable power driven circular saw having a housing, a drive shaft removably carrying a circular saw blade and a generally flat base plate on said housing comprising a main attachment plate having one end bent upwardly and back parallel to the plate forming a generally U-shaped channel adapted to receive one end of the base plate of the saw and the other end and one side bent downwardly to form a right angle flange, an L-shaped handle fixed to said main attachment plate adjacent said one end and curving upwardly and over said main attachment plate generally parallel thereto, a secondary attachment plate having one end bent upwardly and back parallel to the plate forming a second generally U-shaped channel adapted to receive the other end of the base plate of the saw and the other end of said secondary attachment plate being bent downwardly to form a right angle flange parallel to and spaced from the flange on the other end of said main attachment plate, guide means extending between said flanges to maintain them in alignment, fastener adjusting means extending between said flanges for moving said main and secondary plates together to engage the base plate of the saw within the two U-shaped channels and firmly in contact with said plates, elongate cutter guide bar means, removably and adjustably fastened to the side flange of said main attachment plate at an angle to the base plate of the saw, sprocket means removably attached to the drive shaft and an endless saw chain disposed around said sprocket and cutter guide bar means at an angle forward of the drive shaft. Preferably, the guide means between the two attachment plates is a pair of spaced apart rods fixed at one end to the flange of one plate, as by welding and extending through guide holes in the flange of the other plate. The fastener adjusting means is preferably a screw journaled in the flange carrying the guide rods and threaded through a nut fixed on the flange carrying the guide holes. The fastener adjusting means is preferably located between the guide rods. Preferably the sprocket means includes a bushing slidable on the drive shafts, a sprocket rotatable on the bushing, friction clutch means engaging said sprocket and fixed to said bushing.

In the foregoing general description of this invention, I have set out certain objects, purposes and advantages of my invention. Other objects, purposes and advantages of my invention will be apparent from a consideration of the following description and the accompanying drawings in which.

Figure 1:
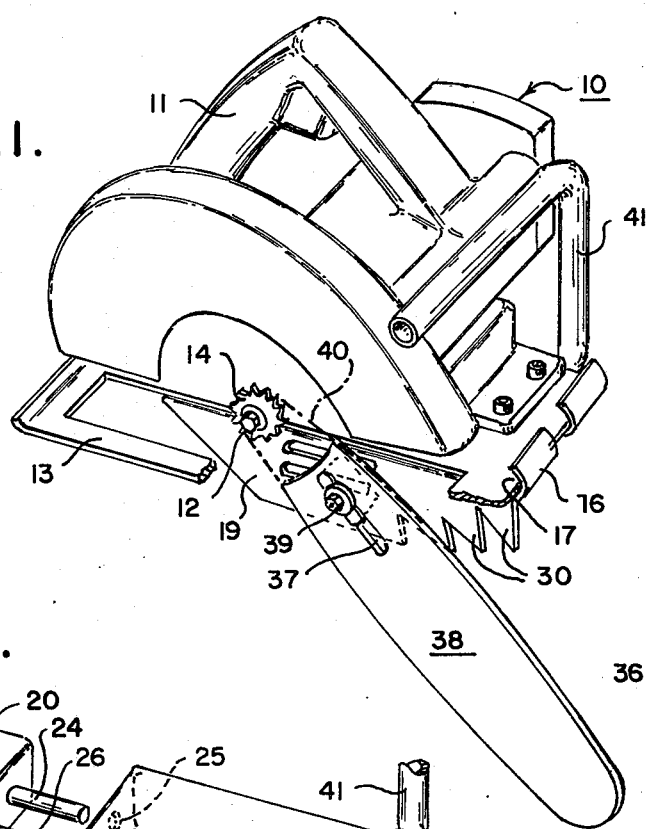
FIG. 1 is an isometric view of a portable circular power saw incorporating the chain saw conversion of my invention.
Figure 2:
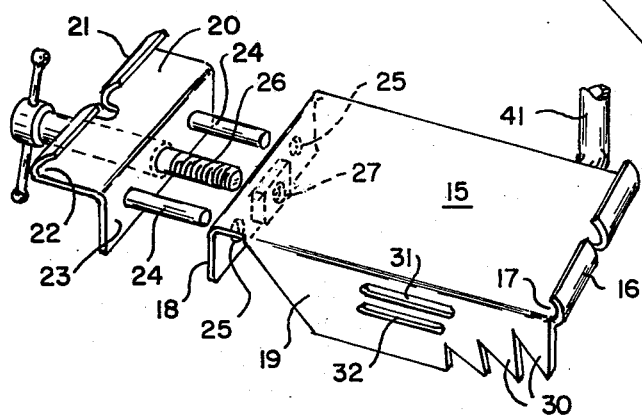
FIG. 2 is an isometric view of the main and secondary attachment plates of FIG. 1.

Referring to the drawings, I have illustrated a conventional portable circular power saw 10 having a housing with a generally rearwardly and upwardly projecting D-shaped handle 11, a drive shaft 12 and a base plate 13, with the circular saw blade removed and replaced by a sprocket assembly 14 on shaft 12. The sprocket assembly 14 is made up of a bushing 14a slidable on drive shaft 12 and having an annular flange 14b, a clutch disc 14c, a sprocket 14d, a clutch disc 14e having a non-circular opening engaging a slot in bushing 14a and a washer 14f and cap screw 14g.

A generally flat main attachment plate 15 is provided slightly narrower than, or equal in width to base plate 13 with its front end 16 bent up and back to form a generally U-shaped channel 17 into which the front end of base plate 13 will fit and having its rear end 18 and one side 19 bent downwardly at right angles. A shorter, generally flat secondary attachment plate 20 is also provided having one end 21 similarly bent up and back to form a U-shaped channel 22 into which the rear end of base plate 13 fits. The opposite end 23 of the secondary attachment plate 20 is bent down at right angles to be parallel to and spaced from end flange 18 of the main attachment plate. A pair of guide rods 24 are welded to end flange 23 and extend through guide holes 25 in end flange 18. A screw 26 is journaled for rotation in an opening in flange 23 between guide rods 24 and is threaded in a nut 27 fixed to flange 18 between guide holes 25. Turning screw 26 threads it into nut 27 to tightly engage base plate 13 within channels 17 and 22 of the main and secondary attachment plates.

The side flange 19 is provided with serrations or teeth 30 which are designed to engage the wood being cut and with two parallel slots 31 and 32 which carry a fastener bolt 33 and pin 34 on an adjustable bar bracket 35. Bracket 35 carries spaced flanges 36 on opposite sides of bolt 33 onto which the slot 37 of chain bar 38 slidably fits. Bar 38 is held in position by nut 39 on bolt 33. The cutter chain 40 is arranged on bar 38 and sprocket 14 in usual manner and tightened by adjusting the position of bar 38 on flanges 36 after which nut 39 is tightened.

A U-shaped handle 41 is attached to the forward end of plate 15 adjacent channel 17. This handle 40 coupled with saw handle 11 provide positive control of the assembly.

Figure 4:
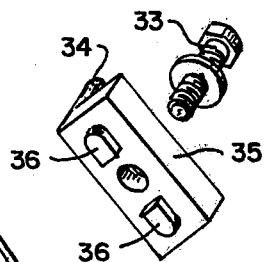
FIG. 4 is an exploded isometric view of the bar bracket of FIG. 1.
Figure 3:
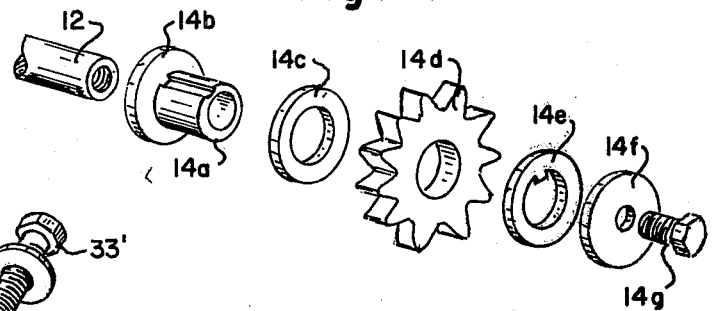
FIG. 3 is an exploded fragmentary view of the clutch assembly.
Figure 5:
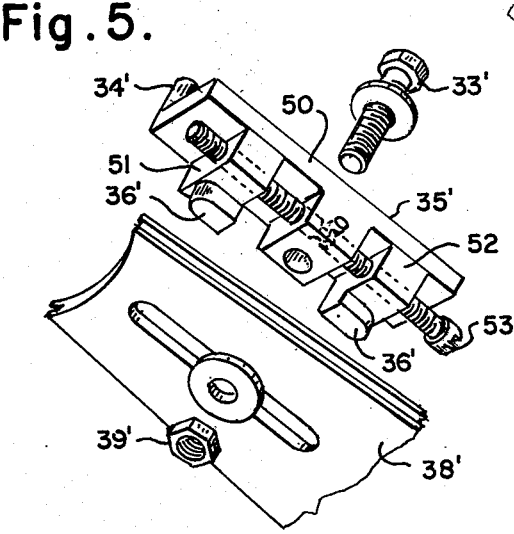
FIG. 5 is an exploded isometric view of a second embodiment of bar bracket providing a positive chain tensioning means.

In the embodiment shown in FIG. 4 all elements are generally the same and bear like numbers with a prime sign. The difference is that bar bracket 35' is made in three parts a base 50 and two sliding members 51 and 52, slidable relative to one another carrying flanges 36'. An adjusting screw 53 is journaled in part 50 and threaded in parts 51 and 52 so that rotation of screw 53 causes the two parts 51 and 52 to move relatively to one another to adjust the position of bar 38'.

In the foregoing specification I have set out certain preferred practices and embodiments of this invention, however, it will be understood that this invention may be otherwise embodied within the scope of the following claims.

I claim:

1. A chain saw conversion unit for a portable power driven circular saw having a housing, a drive shaft removably carrying a circular saw blade and a generally flat base plate on said housing comprising a main attachment plate having one end bent upwardly and back parallel to the plate forming a generally U-shaped channel adapted to receive one end of the base plate of the saw and the other end and one side bent downwardly to form a right angle flange, an L-shaped handle fixed to said main attachment plate adjacent said one end and curving upwardly and over said main attachment plate generally parallel thereto, a secondary attachment plate having one end bent upwardly and back parallel to the plate forming a second generally U-shaped channel adapted to receive the other end of the base plate of the saw and the other end of said secondary attachment plate being bent downwardly to form a right angle flange parallel to and spaced from the flange on the other end of said main attachment plate, guide means extending between said flanges to maintain them in alignment, fastener adjusting means extending between said flanges for moving said main and secondary plates together to engage the base plate of the saw within the two U-shaped channels and firmly in contact with said plates, elongate cutter guide bar means, removably and adjustably fastened to the side flange of said main attachment plate at an angle to the base plate of the saw, sprocket means removably attached to the drive shaft and an endless saw chain disposed around said sprocket and cutter guide bar means at an angle forward of the drive shaft.

2. A chain saw conversion unit as claimed in claim 1 wherein the guide means between the two attachment plates is a pair of spaced rods fixed at one end to the end flange of one plate and extending through guide slots in the end flange of the other plate.

3. A chain saw conversion unit as claimed in claim 1 wherein the fastener adjusting means is a screw journaled for rotation in an end flange of one attachment plate and threaded through nut means on the end flange of the other plate.

4. A chain saw conversion unit as claimed in claim 2 wherein the fastener adjusting means is a screw journaled for rotation in the flange carrying the guide rods and threaded through nut means on the end flange carrying the guide holes.

5. A chain saw conversion unit as claimed in claim 1 wherein the side flange on the main attachment plate is provided with notches forming teeth at the end adjacent the channel and with a pair of spaced slots generally parallel to the plate carrying an adjustable cutter bar bracket movable lengthwise of the flange and adjustably receiving the cutter bar.

6. A chain saw conversion unit as claimed in claim 5 wherein the cutter bar bracket is made in two relatively movable parts having screw means for controlling their relative movement.

7. A chain saw conversion unit as claimed in claim 1 wherein the sprocket means includes a generally cylindrical bushing slidable on the drive shaft, a sprocket freely rotatable on said bushing, friction clutch means engaging said sprocket and fixed to said bushing and fastener means holding said bushing on the drive shaft.

8. A chain saw conversion unit as claimed in claim 7 wherein the friction clutch means is at least one friction washer keyed to said bushing for rotation therewith.

* * * * *